June 2, 1959  E. UMBRICHT  2,889,005
GAS-LIQUID CONTACT APPARATUS
Filed July 19, 1954  2 Sheets-Sheet 2
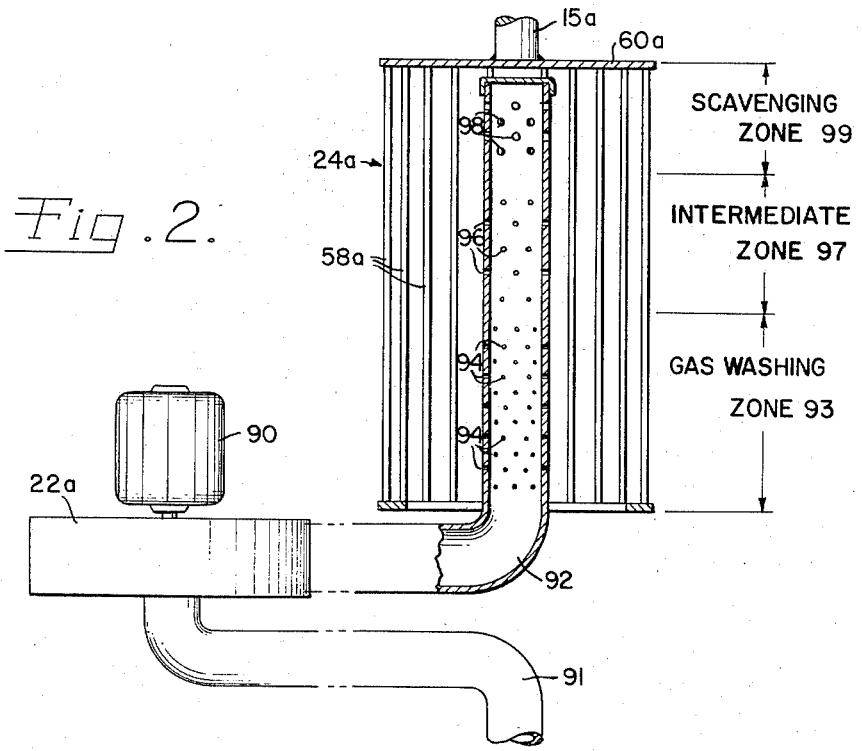
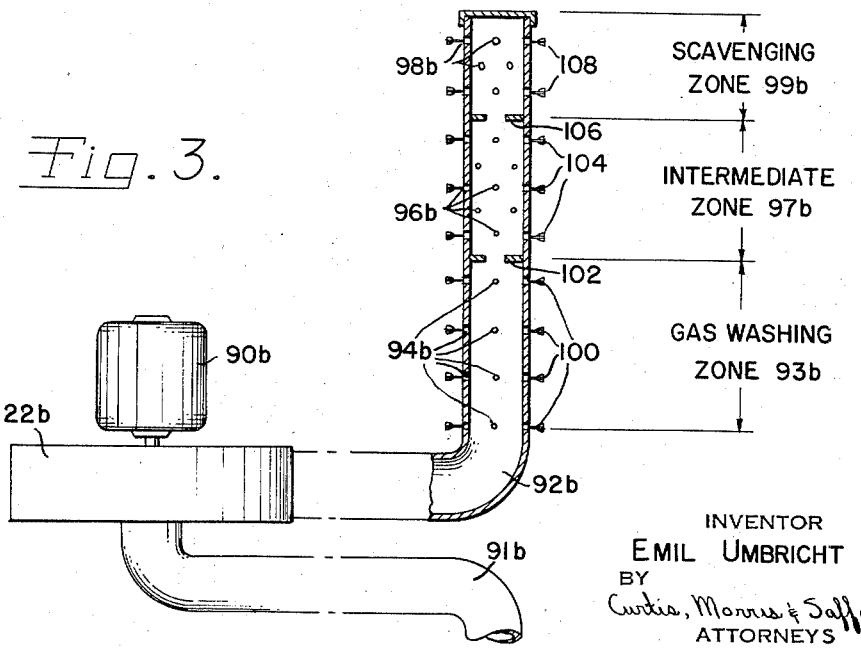
INVENTOR
EMIL UMBRICHT
BY
Curtis, Morris & Safford
ATTORNEYS __United States Patent Office__

2,889,005
Patented June 2, 1959

2,889,005

GAS-LIQUID CONTACT APPARATUS

Emil Umbricht, Jackson, Mich., assignor to Ajem Laboratories, Inc., Detroit, Mich.

Application July 19, 1954, Serial No. 444,012

6 Claims. (Cl. 183—22)

This invention relates to improvements in gas-liquid contact apparatus and particularly to improved apparatus for exposing gaseous materials to liquid sprays, for example for the purpose of removing dust or other solid particles from the gas or for accelerating chemical reaction between a gas and a liquid.

The present invention is described as embodied in air cleaning apparatus. Other applications of the invention will be apparent, for example in other processes involving gas and liquid contact, such as in chemical processes wherein liquids are oxidized by passing oxygen gas through a spray of the liquid to be oxidized. Accordingly, where the terms "water" and "air" are used herein, they will be understood to refer, respectively, to liquids and gases generally.

In a known method of removing dust and other impurities from air, the air to be cleaned is passed through a water spray. The spray serves to "wet" the impurities entrained in the air, tending to form a layer of water around the dirt particles so that the resulting droplets can then be removed from the air stream carrying with them the wetted impurities.

One of the principal objections to this method of air cleaning has been the difficulty of removing all of the water particles from the air stream after the "washing" step has been completed. To clean the air efficiently, the water should be thoroughly atomized to form a fine high velocity mist or fog. In this form, the water effectively permeates all parts of the moving air stream and most readily wets the entrained impurities. However, water particles or droplets that are small enough to wet dirt particles efficiently also are quite difficult to remove from the air stream. While many of the water droplets will collect on the dirt particles and form drops that are large enough to be separated readily, a substantial quantity of the droplets will retain their original size and be carried out of the cleaning apparatus in the discharged air stream.

It is, accordingly, a general object of the present invention to provide an improved air cleaning apparatus wherein maximum air-water surface contact is obtained, and in which substantially complete separation of the air and water are easily achieved at the end of the cleaning operation. More specifically, it is among the advantages of the invention that a water mist or fog is formed to provide a moist atmosphere of maximum liquid surface area through which to pass the air to be cleaned, and yet wherein substantially all of the water droplets forming the fog are separated from the air stream before the latter leaves the cleaning apparatus.

In the described embodiments of the invention, the foregoing and other related objects and advantages are attained in water-spray air cleaning apparatus wherein a non-uniform water spray is utilized as the cleaning agent. More specifically, after the air to be cleaned is passed through a high velocity water fog composed of minute water droplets to perform the wetting operation, the air is passed through a dense spray formed of larger water particles that provides an effective water screen which coalesces and removes the small foglike particles. As a result, the smaller water drops which the air first encounters in being moved through the spray are enabled to wet impurities thoroughly for most efficient cleaning, and subsequently are themselves collected by contact with the larger water particles. The larger drops then are readily removed from the moving air stream.

A more complete understanding of the apparatus of the present invention will be obtained from the following description of various apparatus embodying the present invention, considered in conjunction with the accompanying drawings, in which:

Figure 2 is a partial vertical longitudinal sectional view of spray-generating apparatus suitable for use in the apparatus of Figure 1; and Figure 3 is a partial vertical longitudinal sectional view of a modified form of the spray-generating apparatus also suitable for use in the apparatus of Figure 1.

Figure 1:
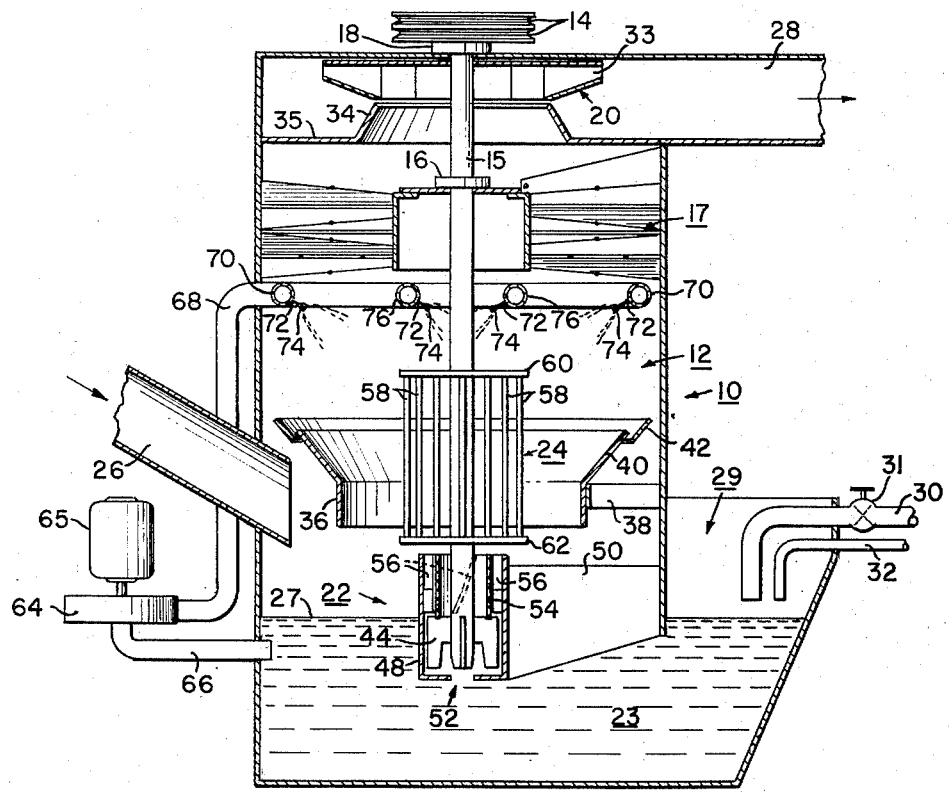
Figure 1 is a vertical longitudinal sectional view partially diagrammatic illustrating apparatus for practicing the method of the present invention.

As was briefly stated in the foregoing introductory discussion, water-spray air-cleaning and similar gas-liquid contact processes involving the use of a liquid spray, generally require that the droplets of liquid making up the spray be as small as possible in order to provide maximum liquid surface area for making contact with the gas to provide a more efficient wetting action. On the other hand, it is often equally important that the liquid and the gas be readily separable at the end of the operation in which the gas-liquid contact takes place.

In the case of air washing, for example, it is essential that the air leaving the washing apparatus should not carry with it an appreciable quantity of entrained moisture particles because of the objectionable effect of excessively humid air in areas such as factory buildings to which washed air is circulated. In the case of chemical processes wherein corrosive, poisonous or relatively expensive treating liquids are involved, it is important to protect apparatus or personnel subsequently exposed to the gas, and it is also economically important to recover as much as possible of the liquid.

These two conflicting requirements—small liquid droplets and substantially complete gas-liquid separation—together with the necessity for handling rapidly large volumes of gas—heretofore have posed a troublesome problem in processes of this kind. In a typical apparatus, the washed air follows a tortuous zig-zag path through a baffle structure just before being discharged, in order that liquid particles carried by the air stream will be trapped and separated from the moving air. Because of the larger mass of the liquid particles carried by the air stream, a large proportion of them are unable to follow the sudden changes in the direction of the air moving through the baffles and are collected on the baffles to drop back into the washing apparatus. In practice, it is found that a substantial percentage of the smaller liquid particles are carried through conventional baffle structure because they are of such negligible mass that they follow readily the sudden changes in direction of the air stream.

In the present system this difficulty is overcome by passing the air that may be carrying very small liquid droplets through a spray in which the drop size and concentration is so great that a liquid "screen" is formed on which the small droplets carried by the air stream from the washing zone are agglomerated by contact with the larger liquid drops in the liquid screen. Drops of this size either will be too heavy to be carried by the air stream, and will drop out of their own weight, or they will be unable to follow the sudden changes of direction of the moving air passing through the tortuous baffle path, and, hence, will be collected on the baffle surfaces to fall back into the washing apparatus.

While there are, as previously mentioned, a variety of different gas-liquid contact processes in which the apparatus of the present invention can be used to advantage, in each of which specifically different apparatus may be involved, there is shown in the drawings and will now be described different forms of apparatus for air washing which are found to be suitable for practicing the present invention.

The apparatus shown in Figure 1 comprises an upright, substantially cylindrical casing 10 that is closed at top and bottom to enclose a space 12 within which the washing and separating operations take place. A motor (not shown) mounted on the outside of the casing 10 is coupled by belts (not shown) to a pair of sheaves 14 to drive a shaft 15 that is journaled in a bearing 16 at the top of a baffle assembly 17 and supported by an axial thrust bearing 18 at the top of the casing 10 for rotation at about an axis parallel with the axis of the casing. The arrangement of the motor and belts is shown in U.S. Patent No. 2,599,202. The shaft 15 carries at its upper end a fan or blower 20, for moving air upwardly through the space 12, and at its lower end is coupled to drive a pump 22 for raising water from a reservoir 23 in the bottom of the casing to a rotatable spray generating cage 24, as described hereinafter. An inlet duct 26 is provided in the side of the lower part of the casing 10, somewhat above the normal water level 27, to admit air to be washed into the space 12. The washed air is discharged through a side outlet duct 28 at the top of the casing 10. A bin-like opening 29 at the bottom of the casing provides both an inlet for charging the apparatus with water, for example, through a pipe 30 and control valve 31. Also, the opening 29 gives access for removing accumulated impurities from the water reservoir 23. When the apparatus is used for chemical reactions, various solutions may be added to the liquid through a pipe 32.

The fan 20 at the upper end of the casing 10 is of the centrifugal type and includes a number of blades or impellers 33 mounted for rotation with the shaft 15. A metal shield 34 below the blades 32, together with a partition 35 in the top of the casing 10, forms a fan housing that serves to direct air-flow outwardly through the discharge duct 28.

An annular baffle 36 is provided adjacent the inlet opening 26 to distribute the upward air-flow uniformly across the space 12. This baffle comprises a ring carried by support brackets 38 and having an outwardly inclined upper skirt portion 40 spaced slightly from and surrounded by a similarly inclined outer skirt 42. With this arrangement, the incoming air is directed within, around and between the skirts 40, 42 and is thereby distributed substantially uniformly across the space 12.

The pump 22 is of the centrifugal type, and includes four blade-like impellers 44 extending radially outwardly and driven from the shaft 15. The impellers 44 rotate within a cylindrical housing 48 that is carried by a supporting structure 50 fixed to the inside of the main casing 10. The structure 50 also may carry a lower bearing support for shaft 15 (not shown), the structure of the pump 22 and the lower bearing may be arranged as shown in the above-identified U.S. patent.

The pump casing 48 has a central opening 52 through which liquid can enter the pump. A segment at the lower innermost corner of each impeller blade 44 is cut away immediately above this opening 52 so that rotation of the blades 44 will not interfere with the intake of liquid from the reservoir 23.

As the impeller blades 44 rotate they throw liquid outwardly against the housing 48. Since the liquid is prevented from flowing downwardly by the bottom of the casing 48, it is forced to flow upwardly around a tubular element 54 that extends upwardly from the upper edges of the blades 44. This upward flow of liquid is aided and partially regulated by four circumferentially-spaced vanes 56 that extend radially inwardly from the pump housing 48 in the space between the housing 48 and the tubular element 54.

For best efficiency it is preferable that the vanes 56 be slanted in the direction of rotation of the impeller blades 44, and also that the vanes be bent so that the upper portions thereof are more nearly vertical than the lower portions. By suitable selection of the vane angle and shape, the upward travel of the liquid can be controlled readily. This arrangement is useful in connection with control of the spray generation, as explained below.

The spray generator cage 24 includes a number of vertical rods 58 (20 to 40 is the usual number) suspended from the periphery of a disc bracket 60 fixed to the shaft 15 with a ring 62 connecting the lower ends of the rods 58.

As the shaft 15 rotates, the cage 24 rotates and the pump impeller-blades 44 rotate to discharge water upwardly inside the rotating cage. When the water forced into the cage 24 is struck by one of the rapidly moving cage rods 58, it is thrown outwardly into space 12 in the form of a spray including a great number of small particles. Preferably, the pump 22 is arranged to distribute the water as uniformly as possible from the top to the bottom of the cage 24 thus producing a spray of substantially uniform density and of optimum particle size and velocity outside of the cage and extending from the bottom to the top of an air-washing zone around the cage.

As previously stated, a very fine spray is required for the washing operation, while a spray of greater density and larger drops is required for screening out the fine spray particles from the moving air-stream. A dense curtain spray of larger particles to scavenge the smaller particles from the washed air as it moves out of the washing zone is created in a scavenging zone above the cage 24. The small water particles collide with the larger scavenging particles and agglomerate into larger droplets, the larger droplets falling into the reservoir 23 or striking the baffles 17 to be removed from the air before being discharged through the duct 28.

To provide the denser scavenging spray, a pump 64, driven by a motor 65 has an inlet pipe 66 connected to the reservoir 23 and an outlet pipe 68 connected to a pipe 70 arranged in circular form around the inner surface of the casing 10 and provided with a number of uniformly-spaced orifices 72. Positioned in front of each of the orifices is a bullet-shaped director 74 which directs a spray of water from the orifice 72 into a conical spray of substantially uniform density. The pump 64 supplies water to the pipe 70 under sufficient pressure to produce the desired spray. The directors 74 and the orifices 72 may be constructed, for example, as described in my copending U.S. patent application Serial No. 334,429, filed February 2, 1953, now U.S. Patent No. 2,778,685, issued January 22, 1957.

The orifices and directors are arranged to spray downwardly at about a 30° angle with respect to the horizontal so that the space between the upper edge of the cage 24 and the casing 10 is filled with a dense spray of larger droplets. The orifices are placed close enough together so that substantially all of the cross-sectional space at the level of the top of the cage 24 is filled with this scavenging spray. One or more additional pipes, as at 76, may be positioned concentrically within the pipe 70 or additional spray heads can be provided by arranging the pipe 70 in a spiral form.

The droplets of water produced by the orifices 72 and the directors 74 are much larger in average size than those produced by the cage 24 and are effective therefore in capturing the finer droplets of water and prevent them from being carried through the baffle system 17.

Figure 2 shows spray-generating apparatus in which the rotating cage is used to generate both the smaller water particles for the washing zone and the larger water particles for the scavenging zone. The various parts in Figure 2 corresponding to those of Figure 1 are given corresponding reference numbers followed by the suffix "a." The apparatus of Figure 2 may be identical with the apparatus of Figure 1 except that in the apparatus of Figure 2 the pump 64 and the pipes 70 and 76 are omitted, the cage 24a may be made longer so as to extend nearer to the baffle system (not shown in Figure 2), and the shaft 15a terminates at the disc 60a. The only other difference between Figures 1 and 2 is that in Figure 2 a radial discharge centrifugal pump 22a replaces the axial discharge pump 22 of Figure 1.

The pump 22a driven by a motor 90 sucks up water from the reservoir 23 (not shown in Figure 2) through an inlet pipe 91 and discharges the water under relatively high pressure into a perforated pipe 92 extending axially up into the cage 24a and with its top end capped just beneath the disc 60a.

To provide a first washing zone 93 surrounding approximately the lower half of the cage 24a with a spray of small particles, the lower half of the pipe 92 in cage 24a is perforated with a number of small radial holes 94. The fine streams of water squirting through the holes 94 are struck by the revolving rods 58a and are broken up and slung out into the air washing zone 93 in the form of a fine high velocity spray.

Above the holes 94 in the pipe 92 are a number of somewhat larger radial holes 96. These occupy approximately one quarter the length of the pipe 92 within cage 24 and generate a spray of intermediate size droplets within an intermediate zone 97 surrounding cage 24 above zone 93. The water particles in zone 97 complete the washing operation and begin the scavenging operation.

Approximately the top quarter of the length of pipe 92 in the cage 24 has a number of larger radial holes 98 which spurt fairly large streams of water out against the revolving bars 58a to generate a dense high velocity curtain spray of larger particles which act in a scavenging zone surrounding approximately the top one quarter of cage 24a so as to remove substantially all of the water particles from the air.

The apparatus partially illustrated on an enlarged scale in Figure 3 has a pump and spray pipe somewhat similar to that shown in Figure 2, and parts corresponding to those of Figures 1 and 2 have corresponding reference numbers followed with the suffix "b." To provide a fine spray for the air washing zone which may surround the bottom of the pipe 92b over a fraction of its total length in the range from about 25% to about 65%, the pipe 92b has a number of radial orifices 94b with bullet shaped directors 100 aligned therewith as shown. Because orifices 94b directly communicate with the pump 22b, they receive the water under high pressure, causing finely divided conical shaped sprays of water to leave directors 100 and squirt across the washing zone 93b. Because of the conical shapes of the sprays, the zone 93b is less well defined and blends into and overlaps the intermediate zone 97b.

An orifice plate 102 in the pipe 92b reduces the pressure of the water reaching the holes 96b so that larger size droplets are formed by the holes 96b and their bullet-shaped directors 104 to form a denser spray in an intermediate zone 97b surrounding the middle portion of the pipe 92b over a fraction of the length of the pipe 92b from about 20% to about 55%.

A second orifice plate 106 in the pipe 92b further reduces the pressure in the top of pipe 92b so that relatively large size droplets are squirted from the holes 98b past their bullet-shaped directors 108 to form a dense spray of still larger size droplets in the scavenging zone 99b surrounding the top portion of the pipe 92b over a fraction of the length of the pipe 92b from about 15% to about 50%.

An advantage of the apparatus of Figure 3 is that the relative sizes and amount of overlapping of the zones may be adjusted effectively to provide a non-uniform spray which gradually changes from small droplets adjacent the bottom of cage 24b to a dense spray of larger particles near the top of cage 24b, to provide a gradual transition from washing to scavenging as the air flows up past cage 24b.

The pump 22 and cage 24 of Figure 1 may be used without the pipes 70 and 76 to generate a non-uniform spray by properly adjusting the delivery of water from pump 22 to cage 24. By pumping an excess of liquid to the top of the cage, both the liquid drop size and the spray density can be made greater around the top of the cage than at any other point along the cage.

To accomplish this result, it is necessary to give the pump output sufficient head and direction so as to shoot a substantial portion of the water up to the top of the cage before striking the rods 58. This will cause the pumped liquid to tend to "pile up" as it strikes the disc 60, thereby effectively developing the excess of liquid to form a dense spray of larger particles of water in a scavenging zone around the top of cage 24.

From the foregoing description, it is seen that my invention provides method and apparatus well adapted to accomplish the ends and objects hereinbefore set forth and which may be modified as may best suit different washing applications or chemical processes all within the scope of my invention and that in certain applications various parts of the apparatus may be used without the use of other corresponding parts all as may best suit the particular application involved without departing from the scope of my invention.

What is claimed is:

1. Gas-washing apparatus for washing gases to remove impurities therefrom by means of a first liquid spray of fine droplets and for removing the fine droplets from the washed gas by means of a second liquid spray of larger droplets and comprising a casing having a vertical axis, means for forcing gas upwardly through said casing in directions substantially parallel with its axis, first spray-generating means in the lower portion of said casing and near the axis of said casing, including a vertically extending rotatable axle and a rotatable spray-generating mechanism for producing a first fine spray moving horizontally outwardly away from said mechanism toward the inner vertical surface of said casing, second spray-generating means above said rotatable mechanism defining a plurality of liquid jets adjacent to the inner vertical surface of said casing aimed inwardly and downwardly at about a 30° angle with respect to the horizontal, liquid-pumping means supplying liquid under pressure to said jets for producing a second scavenging spray of larger average drop size moving at high velocity, and baffle apparatus above said liquid jets abruptly changing the direction of said gas in flowing therethrough.

2. Apparatus for washing gases to remove impurities therefrom by means of a spray of liquid material and for discharging the washed gases while preventing the discharge of any substantial amount of droplets of the liquid material therein comprising a vertically-extending casing having a space therein, said casing having an intake for said gas near its lower portion and an outlet for said gas near its upper portion, means for forcing said gas through said space from said intake upwardly to said outlet, first spray-generating means for producing a first spray of said liquid material of substantially uniformly small droplets moving approximately horizontally across the lower portion of said space in a first direction for wetting impurities entrained in the gas, said gas passing upwardly through said spray at a velocity sufficient to produce a substantial upward deflection of the small droplets of said first spray, second spray-generating means above said first spray-generating means for producing a dense spray of said liquid material of substantially uniformly larger droplets moving downwardly at a substantial angle across the upper portion of said space in a second direction generally opposite to said first direction, and baffle apparatus in said casing above said second spray-generating means, said gaseous material having its direction of flow abruptly changed in passing therethrough.

3. Apparatus for producing intimate contact between gaseous and liquid materials comprising a casing having a space therein, said casing having an intake for said gaseous material adjacent one end of said space and an output for said casing adjacent the other end of said space, means for moving said gaseous material through said space from said intake to said outlet, first spray-generating means near the center of said space and remotely positioned from said outlet for producing a spray of said liquid material including small droplets moving radially outwardly in all directions from said first spray generating means toward said casing said spray having a predetermined average size of droplets, second spray-generating means adjacent said casing and nearer said outlet than said first spray-generating means projecting a dense scavenging spray of said liquid material including larger droplets moving forcefully inwardly from said casing toward the center of said space, said scavenging spray having an average droplet size larger than said first spray, and a baffle system in said space nearer said outlet than said second spray-generating means, said baffle system abruptly changing the direction of said gaseous material in passing therethrough.

4. Apparatus for producing intimate contact between gaseous and liquid materials comprising a casing having a space therein, said casing having an intake for said gaseous materials adjacent one end of said space and an outlet for said casing adjacent the other end of said space, means forcing said gaseous material through said space from said intake to said outlet, a rotatable spray-generating mechanism near the center of said space and remotely positioned from said outlet, means for rotating said mechanism about an axis extending in a direction approximately parallel to the average direction of flow of said gaseous material in being forced from said intake to said outlet, said mechanism including a plurality of circumferentially spaced elements revolvable about said axis and adapted to hurl the liquid material outwardly in a high velocity fine spray, a source of said liquid material under pressure for squirting said liquid material against said elements to form a high velocity spray of fine particles of said liquid material forcefully projected outwardly from said axis substantially transversely to said average direction of flow of said gaseous material, said fine particles having a determined average size, second spray generating means nearer said outlet than said cage including a pipe adjacent the casing and having a plurality of orifices forcefully projecting dense jets of larger particles of the liquid material at a substantial angle counter to and inwardly transversely to said average direction of flow, said dense jets of larger particles having a larger average size than said fine particles, and a source of said liquid material under pressure connected to said pipe to form said dense spray of larger particles.

5. Apparatus for producing intimate contact between gaseous and liquid materials comprising a casing having a space therein, said casing having an intake for said gaseous materials adjacent one end of said space and an outlet for said casing adjacent the other end of said space, means forcing said gaseous material through said space from said intake to said outlet, a rotatable spray-generating mechanism near the center of said space and remotely positioned from said outlet, means for rotating said mechanism about an axis extending in a direction approximately parallel to the average direction of flow of said gaseous material in being forced from said intake to said outlet, said mechanism including a plurality of circumferentially spaced elements revolvable about said axis and adapted to hurl the liquid material outwardly in a high velocity fine spray, a source of said liquid material under pressure for squirting said liquid material against said elements to form a high velocity spray of fine particles of said liquid material forcefully projected outwardly from said axis substantially transversely to said average direction of flow of said gaseous material, second spray generating means nearer said outlet than said cage including a pipe adjacent the casing and having a plurality of orifices forcefully projecting dense jets of larger particles of the liquid material at a substantial angle counter to and inwardly transversely to said average direction of flow, bullet-shaped directors aligned with said orifices and directed generally toward said cage to project some of said larger particles in directions partially against said average flow of said gaseous material, and a source of said liquid material under pressure connected to said pipe to form said dense spray of larger particles.

6. Apparatus for producing intimate contact between gaseous and liquid materials comprising a casing having a space therein, said casing having an intake for said gaseous materials adjacent one end of said space and an outlet for said casing adjacent the other end of said space, means forcing said gaseous material through said space from said intake to said outlet, a rotatable spray-generating mechanism near the center of said space and remotely positioned from said outlet, means for rotating said mechanism about an axis extending in a direction approximately parallel to the average direction of flow of said gaseous material in being forced from said intake to said outlet, said mechanism including a plurality of circumferentially spaced elements revolvable about said axis and adapted to hurl the liquid material outwardly in a high velocity fine spray, a source of said liquid material under pressure for squirting said liquid material against said elements to form a high velocity spray of fine particles of said liquid material forcefully projected outwardly from said axis substantially transversely to said average direction of flow of said gaseous material, second spray generating means nearer said outlet than said cage including a pipe adjacent the casing and having a plurality of orifices forcefully projecting dense jets of larger particles of the liquid material at a substantial angle counter to and inwardly transversely to said average direction of flow, bullet-shaped directors aligned with said orifices and directed generally toward said cage to project some of said larger particels in directions partially against said average flow of said gaseous material, third spray generating means nearer said outlet than said cage including a second pipe near the center of said space and having a plurality of orifices directed outwardly transversely to said average direction of flow, a bullet-shaped director aligned with each of said orifices in said second pipe, and a source of said liquid material under pressure connected to said pipes to form said dense spray of larger particles.

References Cited in the file of this patent

UNITED STATES PATENTS

| | | |
|---|---|---|
| 1,102,996 | Bottenstein | July 7, 1914 |
| 1,816,828 | Cutler | Aug. 4, 1931 |
| 1,835,559 | Cutler | Dec. 8, 1931 |
| 2,365,483 | Mode | Dec. 19, 1944 |
| 2,579,282 | Vicard | Dec. 18, 1951 |
| 2,599,202 | Schimpke | June 3, 1952 |
| 2,631,019 | Yates | Mar. 10, 1953 |
| 2,702,699 | Kinney | Feb. 22, 1955 |